(12) United States Patent
Bowling et al.

(10) Patent No.: US 6,227,782 B1
(45) Date of Patent: May 8, 2001

(54) SELF-LOCKING THREADED FASTENER ASSEMBLY

(76) Inventors: Stephen Bowling, 31 Park St., Stamford, CT (US) 06902; W. Kurt Feick, 90 Lambert Rd., New Canaan, CT (US) 06840

( * ) Notice: Subject to any disclaimer, the term of this patent is extended or adjusted under 35 U.S.C. 154(b) by 0 days.

(21) Appl. No.: 09/321,656

(22) Filed: May 28, 1999

(51) Int. Cl.$^7$ .............................. F16B 39/22; F16B 39/32
(52) U.S. Cl. ........................ 411/114; 411/299; 411/949; 411/962
(58) Field of Search .................................. 411/114, 299, 411/399, 949, 951, 962, 115

(56) References Cited

U.S. PATENT DOCUMENTS

| | | |
|---|---|---|
| 32,880 | 7/1861 | Lawrence et al. . |
| 506,596 | 10/1893 | Kirkpatrick et al. . |
| 591,062 | 10/1897 | Smith . |
| 644,159 | 2/1900 | Blanton, Jr. . |
| 908,352 | * 12/1908 | Swart ................................ 411/962 X |
| 1,019,387 | * 3/1912 | Watson ............................. 411/949 X |
| 1,020,668 | 3/1912 | Thompson . |
| 1,024,427 | * 4/1912 | Threm ................................ 411/949 X |
| 1,051,770 | 1/1913 | Slattery . |
| 1,269,059 | 6/1918 | D'Arden . |
| 1,480,967 | * 1/1924 | Stoffel ............................. 411/949 X |
| 1,717,186 | * 6/1929 | Cargle ............................. 411/949 X |
| 2,173,420 | 9/1939 | Kielland . |
| 2,270,813 | 1/1942 | Olson . |
| 2,342,170 | 2/1944 | Tinerman ............................ 24/221 |
| 2,372,889 | 4/1945 | Duggan . |
| 2,398,827 | 4/1946 | Graham . |
| 3,259,161 | 7/1966 | Rosan . |
| 3,339,436 | 9/1967 | Rosan ....................................... 81/3 |
| 3,419,057 | 12/1968 | Hogan . |
| 3,630,252 | 12/1971 | Rosan . |
| 3,993,397 | 11/1976 | Gutshall ............................ 339/246 |
| 4,067,371 | 1/1978 | Stencel . |
| 4,534,101 | 8/1985 | Rosen, Jr. ............................ 29/432 |
| 4,568,228 | 2/1986 | Rosen, Jr. ............................ 411/178 |
| 4,790,703 | 12/1988 | Wing ................................. 411/260 |
| 4,797,022 | 1/1989 | Crigger ........................... 403/408.1 |
| 5,092,725 | 3/1992 | Aittama .............................. 411/190 |
| 5,460,468 | 10/1995 | DiStacio ............................ 411/329 |
| 5,538,378 | 7/1996 | Der Drift ........................... 411/299 |
| 5,606,753 | 3/1997 | Hashimoto ............................. 411/7 |
| 5,897,277 | 4/1999 | Barre ................................. 411/331 |

FOREIGN PATENT DOCUMENTS 142748  5/1920  (GB) .

* cited by examiner

Primary Examiner—Neill Wilson
(74) Attorney, Agent, or Firm—St. Onge Steward Johnston & Reens LLC

(57) ABSTRACT

A self-locking fastener assembly includes a male screw fastener and a related female component (such as a plastic workpiece) for receiving the male screw fastener; a locking element is mounted on, or integrally formed with, the male screw fastener and provides at least one or more flexible fingers extending radially outwardly. The flexible fingers engage the walls of a cavity in the female component. The cavity walls are provided with a plurality of teeth which reliably engage the flexible fingers to prevent counter-rotation of the male screw fastener out of engagement with the female member. In a preferred embodiment, the male screw fastener is a double ended screw having a lower screw end for screwing into a plastic workpiece, and an upper stud end onto which can be mounted a second workpiece, which is secured by a nut. The lower screw end is preferably left hand threaded, while the upper end is preferably right hand threaded, whereby overtorquing force applied to the male screw fastener when the second workpiece is mounted (by cross-threading of the nut or otherwise) causes the male screw fastener to overcome the locking element and the lower screw end to unscrew from the first workpiece, thus preventing wasteful damage to the first workpiece. In another embodiment, the system can prevent counter-rotation of a nut in a cast or molded boss.

18 Claims, 17 Drawing Sheets

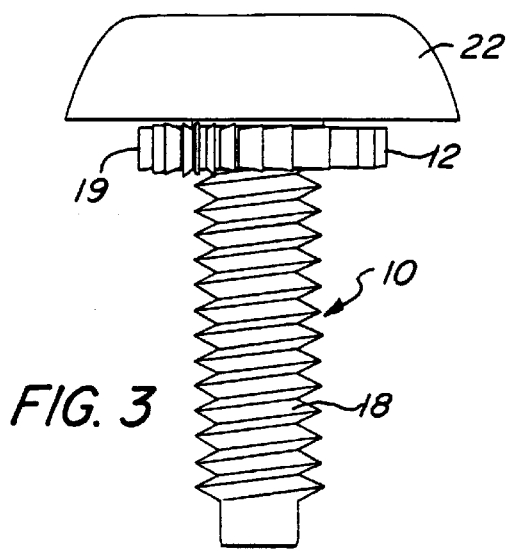
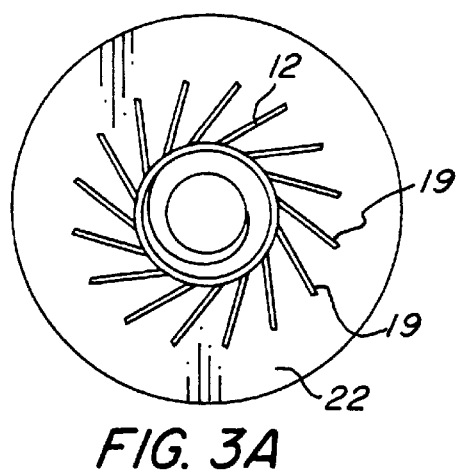
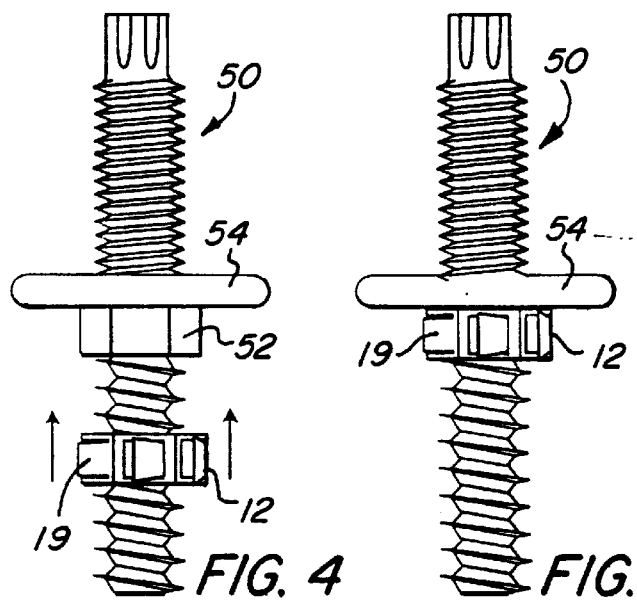
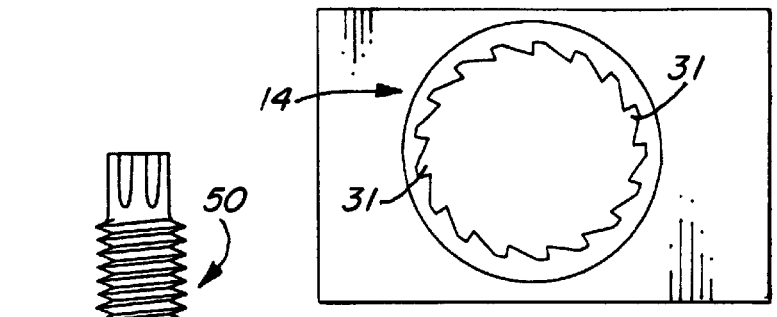
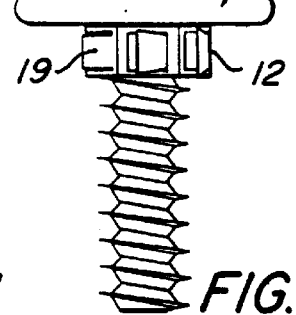
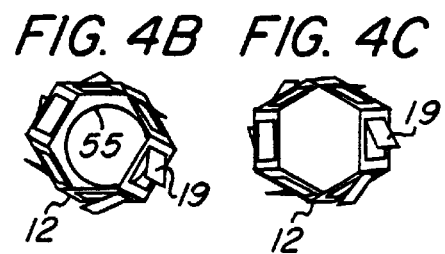
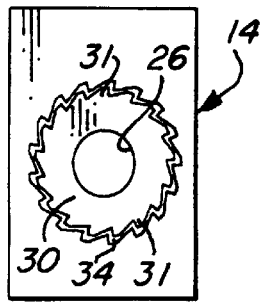
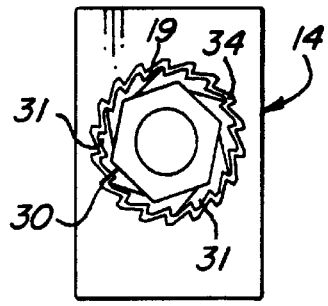
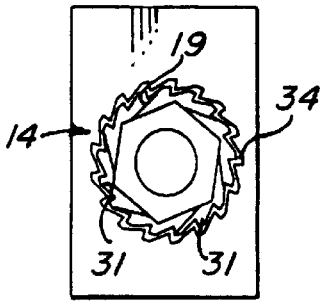

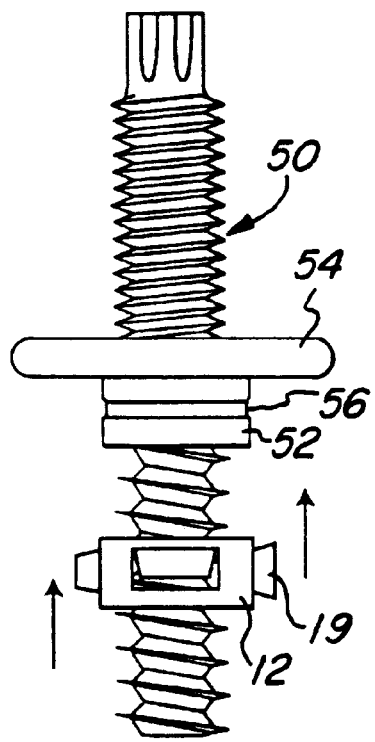
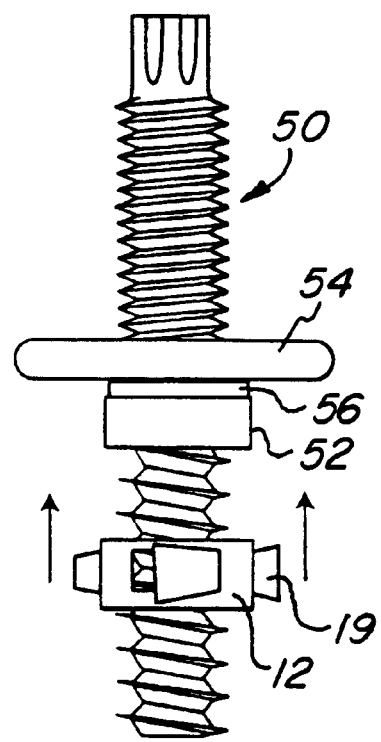
FIG. 5　　　　　　　　FIG. 6
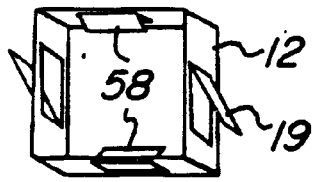
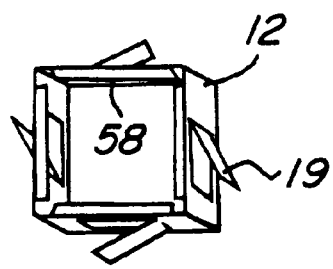
FIG. 5A　　　　　　　FIG. 6A
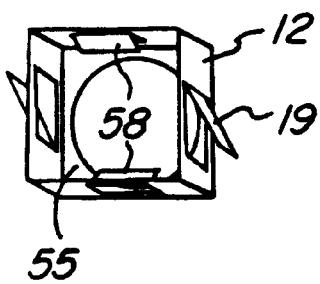
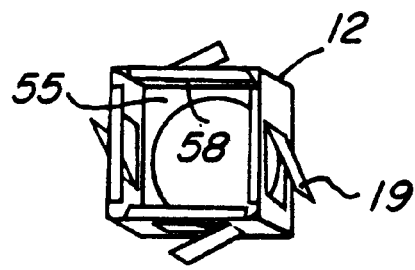
FIG. 5B　　　　　　　FIG. 6B

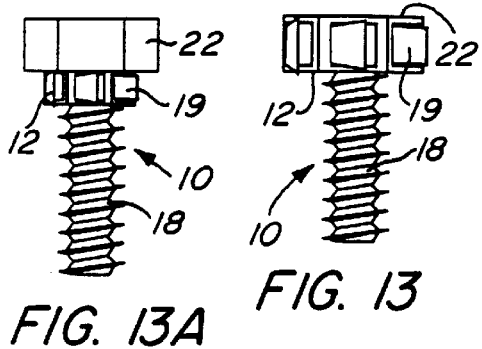 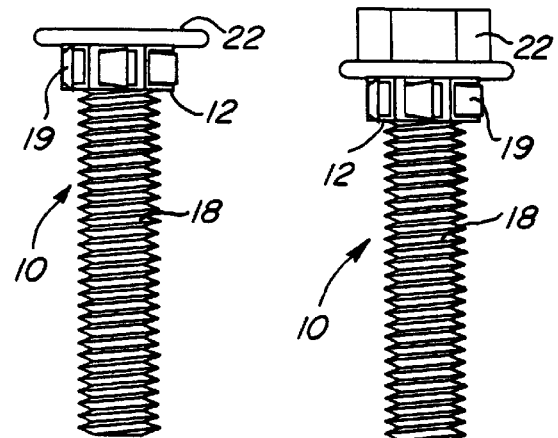
FIG. 13A  FIG. 13  FIG. 13B  FIG. 13C
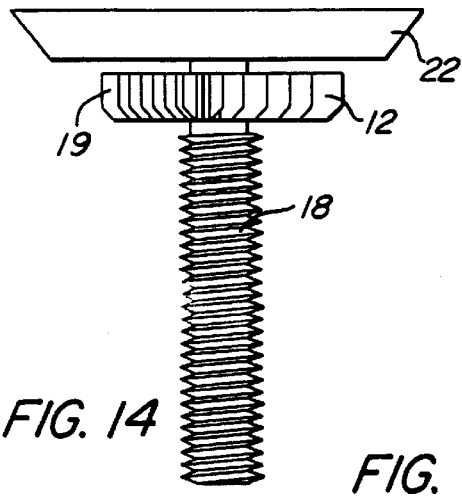 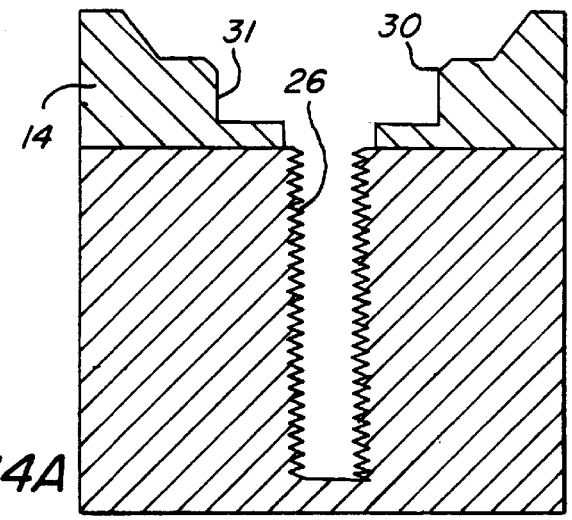
FIG. 14  FIG. 14A
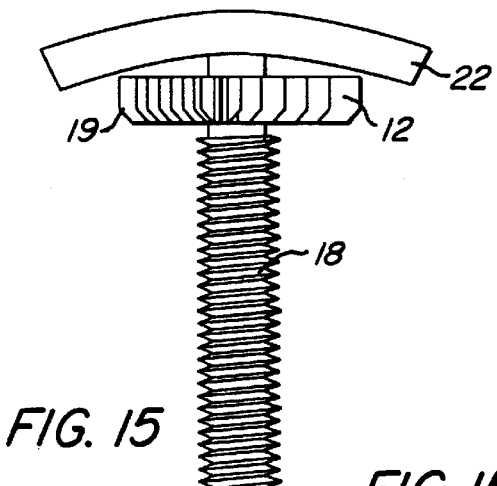 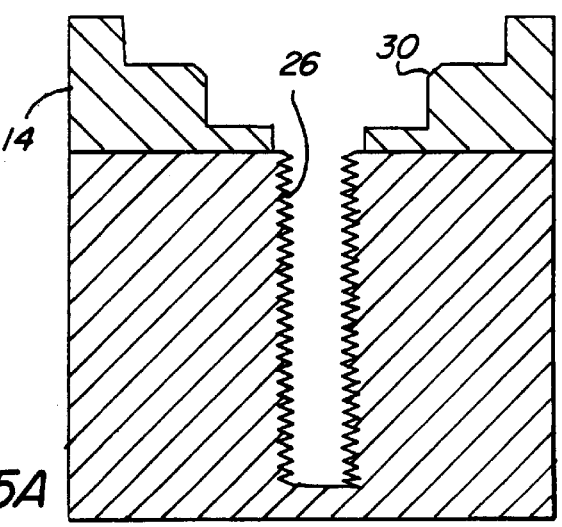
FIG. 15  FIG. 15A

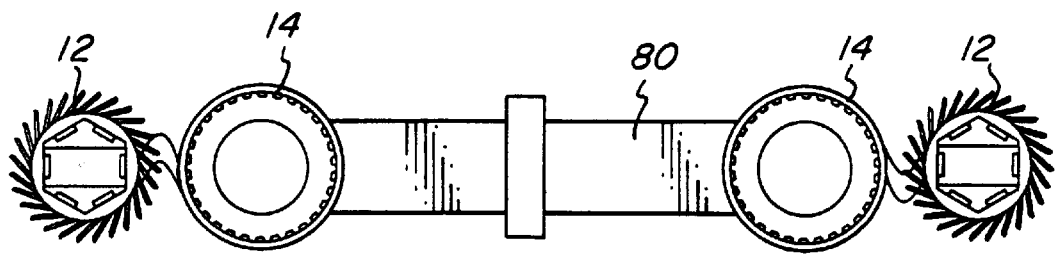
FIG. 50
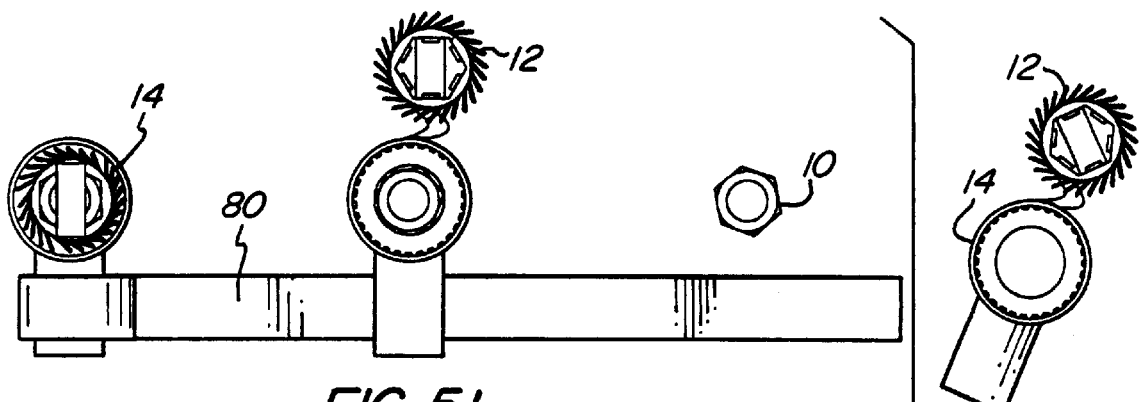
FIG. 51
FIG. 51A
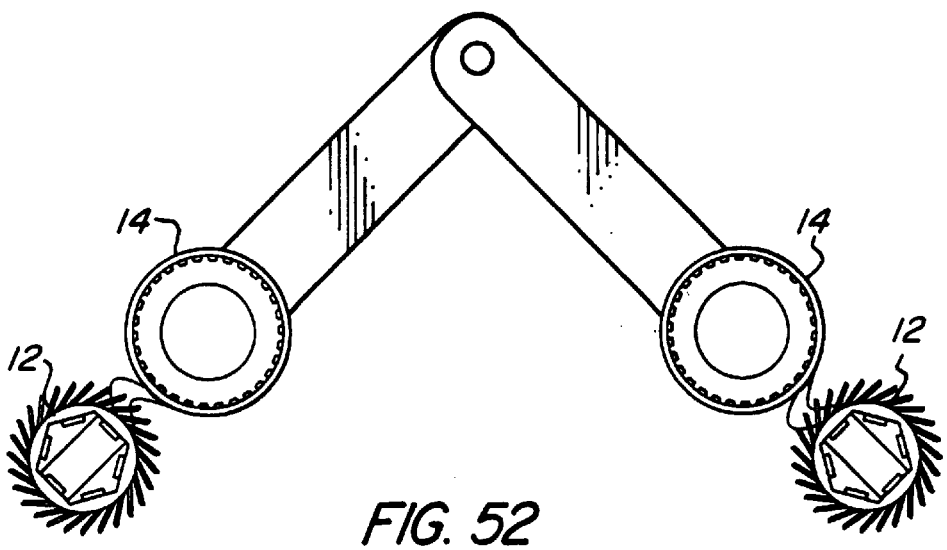
FIG. 52

SELF-LOCKING THREADED FASTENER ASSEMBLY

FIELD OF THE INVENTION

The invention relates to a self-locking fastener assembly adapted to secure a plurality of pieces together, and more particularly to a threaded screw fastener assembly provided with a locking element to prevent the threaded fastener assembly from loosening from a workpiece in which it is installed.

BACKGROUND OF THE INVENTION

A variety of locking threaded fasteners or fastening assemblies are known in the art. The goal of such systems is to prevent the male and female components of the fastening assemblies from loosening and coming apart when subjected to vibration, expansion, contraction and other possible movement. Most such systems rely on provision of increased friction to provide improved thread locking. Such systems include thread coatings such as LOCTITE® thread coatings, and/or other products to create a locking friction between the male and female threads, and/or an increased locking friction between the head of a fastener and the surface of a workpiece to which it is fastened. Some systems employ a mechanical locking system to maintain the respective positions of the male and female fastener components. One example of a known mechanical system is a locking nut, in which is positioned a collar with a plurality of flexible arms extending inwardly; these arms seat in longitudinal channels formed on the outer periphery of the threaded male fastener. Upon engagement of the arms with respective channels, loosening is prevented by preventing relative rotation of the components in a loosening direction. The above described structure is illustrated in U.S. Pat. No. 5,238,342 issued to Stencel.

A typical fastener application in automotive applications using plastic materials involves a metal or plastic screw that is used to secure a component to a plastic workpiece. A problem in such applications is that axial loads resulting from torque are concentrated on a relatively narrow region of the boss surrounding the male screw fastener, causing potential for damage by cracking the workpiece. In many such applications, a metal sleeve or insert is provided in the plastic workpiece to provide for distribution of the force applied in fastening, and to prevent damage by the male fastener to the workpiece. There are significant drawbacks to the use of such inserts. The use of such inserts is expensive, requiring purchase or fabrication of an additional separate component, and the installation thereof in the boss before the screw fastener can be used. This slows the manufacturing speed by requiring the additional manufacturing steps of installing numerous inserts in the plastic workpiece where the fastening will occur. In addition to being expensive, such inserts are prone to pullout from the plastic workpiece at relatively low levels of force. Thus, a component fastened to a plastic workpiece where an insert is used may be less securely installed than would be optimal. For example, in a thermoset plastic, the pullout forces required to remove an insert may actually be less than that needed to remove a screw properly screwed into the workpiece. Finally, the use of inserts impedes recycling of the plastic workpiece in the event the workpiece is disassembled, because the metal sleeve or insert must be drilled out of or punched from the plastic workpiece before the plastic can be recycled.

A common problem encountered in fastener applications used in plastic workpieces arises when the fastener is to operate as a stud onto which another component is to be mounted, and is secured with a nut. One risk is the cross-threading of the nut on the stud, which can result in the nut locking up or seizing on the stud. Continued tightening of a cross-threaded nut can cause turning of the self-tapping threads of the screw, thereby potentially damaging the boss. In the same way, if a nut bottoms out on the stud mounted onto the plastic workpiece, there is the distinct possibility that the nut will strip or otherwise damage the boss.

Therefore, there is a need for a locking screw fastener adapted for use in mounting particularly (though not exclusively) to plastic workpieces; such locking screw fasteners should not require metal inserts or sleeves to be inserted in the workpiece; and they should be adapted to prevent damage to the workpiece in the event of cross-threading or overtorquing of a nut onto a stud portion of the fastener.

SUMMARY OF THE INVENTION

It is therefore an object of the invention to provide a self-locking fastener assembly overcoming drawbacks of the known prior art.

It is another object of the invention to provide a locking element preventing undesirable loosening of the self-locking assembly of the present invention.

It is still another object of the invention to provide a locking element eliminating excessive torque values upon a workpiece to prevent damage to the workpiece.

It is a further object of the invention to provide a self-locking fastener assembly that is removable, and in some instances, reusable, allowing easy servicing or recycling of a workpiece in which it was installed.

It is still a further object of the present invention to provide a self-locking stud assembly which is able to prevent damage to the workpiece, particularly (though not exclusively), a plastic workpiece, in the event of overtorquing of a nut on the stud of the assembly, and which is removable in the case of cross-threading of a nut on the stud assembly.

The invention addresses these and other drawbacks in known prior art fastening assemblies and meets these needs with a novel fastening assembly. Generally, the assembly, according to the invention, comprises a male screw fastener (or a female nut fastener) with a locking element, which has a plurality of flexible fingers extending radially outwardly and angularly from the body of the male screw fastener (or female nut fastener). The male screw fastener (or female nut fastener) mates with a female component. The female component is formed with a cavity whose walls are shaped to form notches for receiving and engaging the fingers. By appropriate selection of the number, size, and composition of the fingers, and the shapes of the cavity walls that engage with them, the amount of torque required to loosen a secured fastener can be selected for a particular application as desired.

Referring to the embodiment using a male screw fastener, the male fastener can comprise, but is not limited to, a stud, bolt or screw, whereas the female component can be incorporated within a nut, casting, stamping, molded part and the like and includes a variety of apertures. In a preferred embodiment, where the female component is a plastic workpiece with an aperture therein, the area of the plastic workpiece surrounding the aperture is referred to as the boss. The aperture has an inner diameter sufficient to receive the shank of the male screw fastener, and is provided in an upper portion with the above described cavity whose walls engage with the fingers of the locking element of the male screw fastener. A plate is preferably provided around the shank of the male screw fastener to disseminate torque loads typically concentrated on the boss. Such load dispersion allows higher torque values to be applied without damaging the boss.

The locking element of the male screw fastener can be integrally formed with, or separately manufactured and mounted to, any region along the entire length of the male screw fastener including a head and shank thereof. Many variations of attachment of the locking element to the male screw fastener may include, for example, press-fitting, swaging, slotting, riveting, welding, gluing, or molding.

The locking element used in the invention is effective in a variety of materials, and the male and/or female components can be made of plastic, composite, metal or any other material suitable to meet the needs for the fastening assembly. Where the male screw fastener is made of a plastic or composite material, it is feasible to mold the male screw fastener including the locking element as a unitary product.

In a preferred embodiment, the male screw fastener includes an upper stud end and a lower screw fastening end, having right hand, left hand, or right/left hand combinations of threads. In the most preferred embodiment, the lower screw fastening end has a left hand thread, and the upper stud end has a right hand thread, such that the screw fastening end is screwed into a workpiece by leftward rotation of the screw; when a second workpiece is mounted to the first workpiece by fitting the stud end through an aperture in the second workpiece, and securing the second workpiece onto the stud with a nut torqued on with conventional right hand rotation, in the event the nut cross-threads or jams, or the fastener otherwise exceeds a maximum on-torque level, the lower screw fastening end will back out of the first workpiece into which it is screwed. In contrast, in prior art assemblies the problem of cross-threading may result in damaging the workpiece. This particular feature also allows the removal and reuse of the male screw fastener without any specifically adapted removal tool.

In another preferred embodiment, a molded plastic screw with normal threads and molded fingers can be re-used by counter-rotating the screw with sufficient torque such that the locking fingers temporarily yield to allow the screw to be backed out of the workpiece into which it is screwed, but which fingers have a tensile memory such that they recover their original position so that the screw can be reused.

In another embodiment, the fastener is a nut fastener to which a locking element is mounted. The fingers of the locking element lock into a cavity and/or boss area of a workpiece.

Other objects, aspects and features of the invention in addition to those mentioned above will be pointed out in or will be understood from the following detailed description in conjunction with the drawings.

BRIEF DESCRIPTION OF DRAWINGS

The above and other features, advantages and objects will become more readily apparent from the following detailed description of the invention when taken in conjunction with accompanying drawings in which:

FIG. 3 is a side elevation view of a third embodiment of a male screw fastener in accordance with the invention, which is provided with an integrally formed locking element having square fingers.

FIG. 3A is a bottom plan view of the male screw with locking element of FIG. 3.

FIG. 3B is a top plan view of another embodiment of a female component implemented as a J-Nut or U-Nut, provided with a "cavity" for receiving the locking element shown in the male fasteners of FIGS. 1, 2, or 3, wherein the "cavity" is defined by an aperture in the upper surface of such J-Nut or U-Nut, with or without space located below said aperture.

FIG. 4 is a side elevation view of a double ended stud fastener according to a further embodiment of the invention in the process of assembly with a locking element; in FIG. 4, the double ended stud fastener has a right hand threaded upper section and a left hand threaded lower section.

FIG. 4A is a side elevation view of the double-ended stud fastener of FIG. 4 shown in an assembled position and provided with the locking element of FIGS. 4B or 4C.

FIG. 4B is a perspective view of the locking element shown in FIG. 4 and mounted on the double-ended stud fastener shown in FIG. 4A, in which the fastening element includes a stop lip.

FIG. 4C is a perspective view of the locking element shown in FIG. 4B, in which a lip is omitted from the fastening element.

FIG. 4D is a top plan view of a female component with a cavity receiving the double ended stud fastener and the locking element shown in FIGS. 4 and 4A, which is adapted to receive the left hand thread of the lower section of the double ended stud fastener.

FIGS. 4E and 4F are top plan views of the female component receiving the left hand thread of the lower section of the double ended stud fastener and the locking element shown in FIGS. 4 and 4A as the fastener is locked in place. In FIG. 4E the position and relative numbers of the fingers of the locking element and the notches of the cavity are such that the fingers sequentially engage the notches, providing a more continuous, but relatively weaker anti-backoff force. In FIG. 4F the position and relative numbers of the fingers of the locking element and the notches of the cavity are such that the fingers simultaneously engage the notches, providing a periodic engagement and disengagement of the fingers in the notches; this provides a stronger anti-backoff force when the fingers are engegd.

FIG. 5 is a side elevation view of another embodiment of a double ended stud fastener in accordance with the invention, having a right hand threaded upper section and a left hand threaded lower section.

FIG. 5A is a perspective view of the locking element shown in FIG. 5, in which a stop lip is omitted from the fastening element.

FIG. 5B is a perspective view of the locking element shown in FIG. 5, in which the fastening element includes a stop lip.

FIG. 6 is a side elevation view of still another embodiment of a double ended stud fastener in accordance with the invention in which the double ended stud fastener has a right hand threaded upper section and a left hand threaded lower section.

FIG. 6A is a perspective view of the locking element shown in FIG. 6, in which a stop lip is omitted from the fastening element.

FIG. 6B is a perspective view of the locking element shown in FIG. 6, in which the fastening element includes a stop lip.

FIG. 13 is a side elevation view of a male screw fastener with a locking element mounted on the head of the male screw fastener.

FIG. 13A is a side elevation view of a male screw fastener with a locking element mounted below the head of the male screw fastener.

FIG. 13B is a side elevation view of another embodiment of a male screw fastener with a locking element mounted below the head of the male screw fastener.

FIG. 13C is a side elevation view of another embodiment of a male screw fastener with a locking element mounted below the head of the male screw fastener.

FIG. 14 is a side elevation view of an embodiment of a male screw fastener in accordance with the invention with a flat head, and a locking element integrally formed therewith.

FIG. 14A is a cross-sectional view of a female component for receiving the male screw fastener of FIG. 14.

FIG. 15 is a side elevation view of an embodiment of a male screw fastener in accordance with the invention with a curved head, and a locking element integrally formed therewith.

FIG. 15A is a cross-sectional view of a female component for receiving the male screw fastener of FIG. 15.

FIG. 41 is a top plan view of two female components secured together by a connecting strap in a locking bridge assembly.

FIG. 42 is a top plan view of the heads of two installed screws.

FIG. 43 is a top plan view of the locking bridge assembly of FIG. 41 installed over the heads of the screws of FIG. 42.

FIG. 44 is a top plan view of the installed locking bridge assembly of FIG. 43 where locking elements have been installed into the female components of the locking bridge assembly.

FIG. 45 is a side elevation view of the locking bridge assembly of FIG. 41.

FIGS. 50, 51, 51A, and 52 illustrate the use of the invention in additional locking bridge embodiments, which also may be used as a replacement for a lockwire assembly.

FIG. 50 is a top plan view of two female components secured together by a telescoping connecting strap in a locking bridge assembly.

FIG. 51 is a top plan view of two female components, one fixed and one movable, on a rigid connecting strap in a locking bridge assembly.

FIG. 51A is a top plan view of a movable female component removed from the rigid connecting strap in the locking bridge assembly of FIG. 51.

FIG. 52 is a top plan view of two female components secured together by a pivoting connecting strap in a locking bridge assembly.

DETAILED DESCRIPTION OF THE INVENTION

Figure 1A:
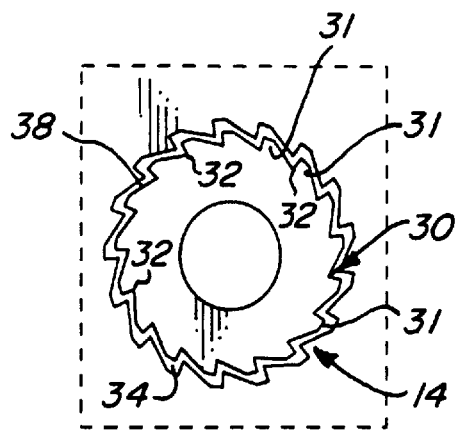
FIG. 1A is a top plan view of a female component provided with a cavity for receiving the locking element of the male screw fastener shown in FIG. 1 (or a female nut fastener as shown in FIG. 9).
Figure 1B:
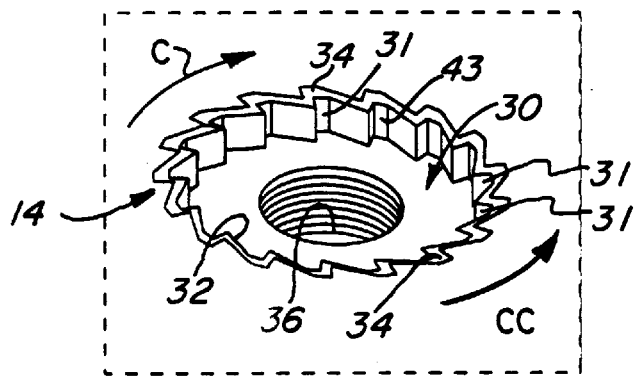
FIG. 1B is a perspective view of the male component shown in FIG. 1A.
Figure 1:
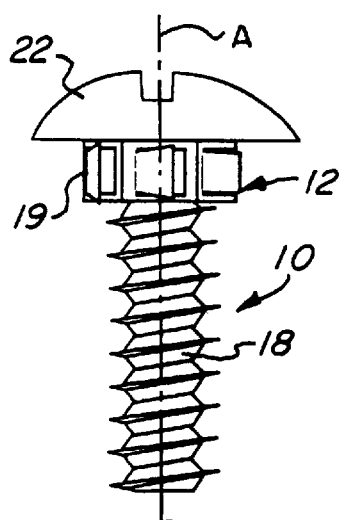
FIG. 1 is a side elevation view of an embodiment of a self-locking male screw fastener provided with a locking element according to one embodiment of the invention in which the screw fastener and locking element are separate components which are assembled together.
Figure 2A:
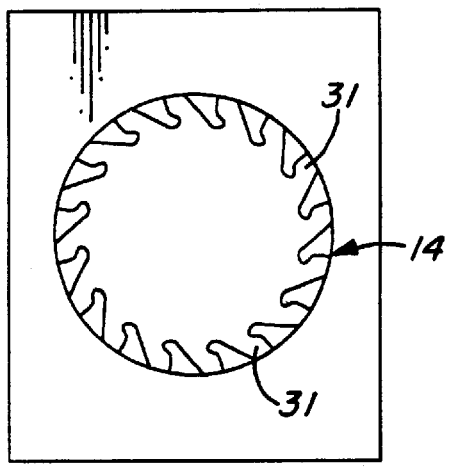
FIG. 2A is a top plan view of an embodiment of a female component implemented as a J-Nut or U-Nut, provided with a "cavity" for receiving the locking element shown in the male fasteners of FIGS. 1, 2, or 3, wherein the "cavity" is defined by an aperture in the upper surface of such J-Nut or U-Nut, with or without space located below said aperture.
Figure 2:
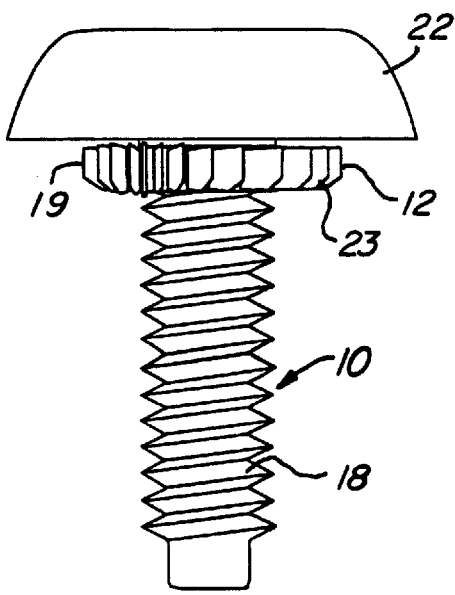
FIG. 2 is a side elevation view of a second embodiment of a male screw fastener in accordance with the invention, which is provided with an integrally formed locking element having fingers with lipped lower corners.
Figure 9:
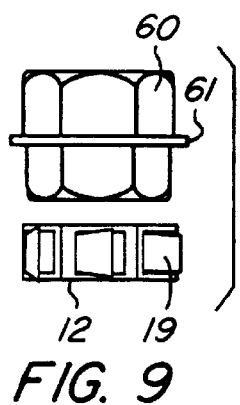
FIG. 9 is a exploded side elevation view of a locking element shown in combination with a nut with a central flange.
Figure 10:
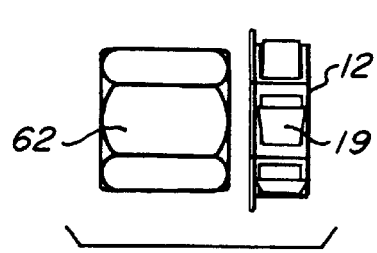
FIG. 10 is an exploded side elevation view of a nut in combination with a locking element.

FIG. 1 illustrates a male screw fastener 10 provided with a locking element 12 which is mounted in its operative position. Male screw fastener 10 has a threaded shaft 18. Threaded shaft 18 may be a screw thread, including a thread forming screw, as shown in FIG. 1, or a bolt as illustrated in FIGS. 2 and 3; or the fastener may be a nut as seen in FIGS. 9 and 10. The locking element 12 can be mounted anywhere along the length of the male screw fastener including on its head (as shown in FIG. 13) or below its head (as shown in FIGS. 1–3) or near the middle of the shaft, and in the case of the double ended stud fasteners shown in FIGS. 4–8.

The locking element 12 can have a variety of shapes (in a top plan view) including round, square, triangular or multi-sided and will essentially conform to the cross-section of some portion of the body of the fastener, such as a shaft or a shank or a cross section of a support section formed thereon. Any material including, but not limited to, thermoset plastics, thermoplastic, spring steel, other metals, or composites or combinations of the above exhibiting the necessary flexibility under load can be used to form the locking element 12.

Referring to FIG. 1, the multi-sided locking element 12 is formed with one or more flexible fingers 19 provided under the head of the screw. The fingers extend radially outwardly from the body of the locking element. The fingers may be either radially aligned with the shaft, or they may be positioned at an angle relative to a plane radially aligned with the shaft. In most applications, it will be preferable to have the fingers be provided at such an angle relative to a plane radially aligned with the shaft, however, in some cases a finger aligned with the radial plane may be desirable.

FIG. 1A shows a top sectional view of a cavity 30 formed in a female component 32. During assembly, upon application of external axial torque, the male screw fastener is displaced along an axis A—A in FIG. 1 into the axial bore 36 of the female component 32 shown in FIG. 1B. The female component 14 may comprise a nut, or a molded, stamped or cast part.

The cavity 30, as shown in FIG. 1A, is formed with a plurality of notches 31. Notches 31 are defined by the walls of cavity 30, and specifically by teeth-shaped portions 32 of the walls. The particular shape of such notches 31 is not limited to any particular shape and, according to the concept of the invention, has to meet the only requirement that is a reliable engagement between the fingers 19 of the locking element and the notches 31 of the cavity 30. FIG. 1B illustrates a plurality of the notches 31 each of which is defined by substantially radially aligned and angularly displaced surfaces, preferably with a flat surface therebetween. Upon mounting of the fastener to the workpiece, the fingers 19 deflect inwardly and flex between outwardly extending and inwardly deflected positions as the fastener is rotated in the direction "C" (FIG. 1B).

The notches 31 are designed to have enough clearance and depth for the fingers 19 to extend into the notches 31, to reciprocally oscillate in and out of locking positions as the male screw fastener is screwed into place. The fingers have a sufficient strength that they hold the male screw fastener in place, and prevent backing off of the fastener from the axial bore of the female component (by rotation in direction "CC"); however, the fingers also have a limit to their resistance to counter-rotation of the male screw fastener, so that the structure can yield at a particular torque for removability of the male fastener as needed, while still providing the holding power needed to resist loosening of the male and female components.

As known in the art, fastener loads are usually concentrated within a boss region, particularly where a female component is plastic, and the load may be concentrated in the upper areas of the boss surrounding the axial bore of the female component. To minimize potential damage to the workpiece boss by overtorquing, an enlarged screw head or plate or flange is desirable to spread the pressure over a broader area. Fatigue of the boss surrounding the thread region can also be controlled by specifically designing locking elements to transfer loads from the boss around the threads to a region out of contact with the threads such as the head, fingers and/or notches. Dissipation of load forces can allow for the elimination of metallic or composite inserts frequently used in the art.

The reverse torque of the locking element can be controlled by having the fingers formed with varying thickness and/or made of different materials. Further, arrangement of the notches 31 can likewise have numerous designs. For example, it is possible to have a plurality of notches 31 simultaneously engaging a plurality of fingers 19. Still another possibility is when certain groups of the fingers are engaged in various sequences. The different engagement options are designed to either dissipate loads on the locking engagements or minimize angular differentials between locking engagements. The precise number of notches or fingers can be varied; the number of notches will preferably be greater than the number of fingers, or they may be equal in number, or potentially, less than the number of fingers.

The locking element shown in FIG. 2 is characterized by having fingers 19 with clipped leading edges 23, compared with the square fingers 19 of the fastener of FIG. 3. These clipped edges extend angularly backwardly and improve the seating of locking fingers 19 into cavity 30, preventing damage to the fingers 19. Alternatively, the upper surface of the female component 14 may be beveled inwardly from its upper surface towards the walls of the cavity 30. Such beveled/countersunk area 34 in an upper surface of the female component 14 surrounding cavity 30 directs the flexible fingers 19 to seat into cavity 30 when the threaded male fastener is rotated in bore 36 of the female component 14.

FIGS. 4–8 each illustrates a respective double-ended stud fastener 50 showing different top/bottom thread combinations, and different support sections 52 for receiving locking elements 12 and for preventing relative rotation between the locking element 12 and the fastener 50. Each such fastener 50 has a stop plate 54 to cover the cavity into which the locking element is seated, to provide a stable stud, to prevent escape of the locking fingers, and to prevent undesired entry of foreign object debris into the cavity.

FIG. 4 shows a hexagonal cross-section support section 52 with the locking element 12 thereon, as illustrated in FIG. 4A. The locking element 12 can be attached by snap fit, or friction fit, as illustrated in the drawings herein, or it may be welded, glued, or otherwise secured. As shown in FIG. 4B, the locking element 12 may also be provided with a stop lip 55 for seating against a bottom of the support section 52 upon final installation of the locking element 12. The locking element shown in FIG. 4C omits the stop lip 55.

FIG. 4D shows a female component 14 for receiving stud fastener 50. FIGS. 4E and 4F show the fingers 19 of a stud fastener 50 as it is installed in the female component 14. FIG. 4E illustrates a locking element 12 that is designed to provide a system of relatively weak back-off locking effect, but which is in effect nearly continuously, by a combination of fingers 19 and notches 31 that provide for only one finger 19, out of six such fingers 19, to be engaged at any one time (in this case, the lowermost finger of FIG. 4E). FIG. 4F illustrates a locking element 12 that is designed to provide a system of relatively strong back-off locking effect, but which is in effect is applied in stepwise fashion, by a combination of fingers 19 and notches 31 that provide for six fingers to be engaged (or between engaged positions) simultaneously.

FIGS. 5–5B shows the support section 52 formed with a peripheral groove 56. The locking element 12, as shown in FIG. 5A, is formed with a square cross-section and has at least one tab 58 extending inwardly and engaging the groove. The locking element 12 shown in FIG. 5B differs from the one shown in FIG. 5A by having the stop lip 55 formed on a bottom of the locking element 12.

FIGS. 6–6B illustrate the support section 52 formed with a reduced annular top region 56. Engagement between the locking element 12 shown in FIGS. 6A and 6B is provided by having side flanges 58 formed on top of the side walls of the locking element 12 which resiliently engage the region 56. Similar to the locking elements shown in FIG. 4B, the optional stop lip 55 is provided on the device shown in FIG. 6B.

Figure 7:
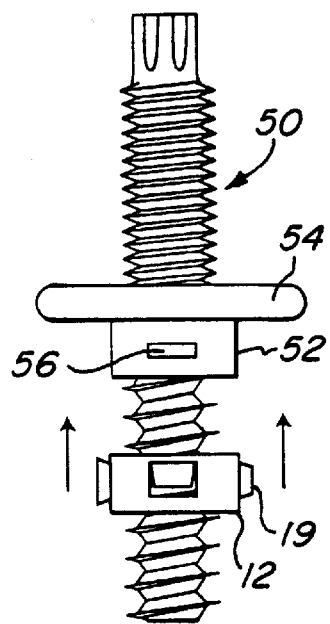
FIG. 7 is a side elevation view of a further embodiment of a double ended stud fastener in accordance with the invention in which the double ended stud fastener has a right hand threaded upper section and a right hand threaded lower section.
Figure 7A:
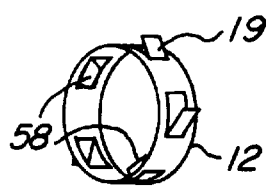
FIG. 7A is a perspective view of the locking element shown in FIG. 7, in which a stop lip is omitted from the fastening element.
Figure 8A:
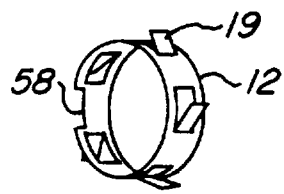
FIG. 8A is a perspective view of the locking element shown in FIG. 8, in which a stop lip is omitted from the fastening element.
Figure 7B:
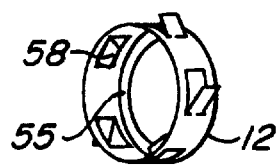
FIG. 7B is a perspective view of the locking element shown in FIG. 7 and formed with a stop lip.
Figure 7C:
FIG. 7C is a top plan view of the locking element shown in FIG. 7A.

Alternatively, as shown in FIGS. 7–7C, a key hole 56 may be formed in the support section 52, key hole 56 receives a tab 58 which extends inwardly from the side walls of the locking element 12 as seen in FIGS. 7A and 7B. Lip 55 may optionally be provided to act as stop, as shown in FIG. 7B.

Figure 8:
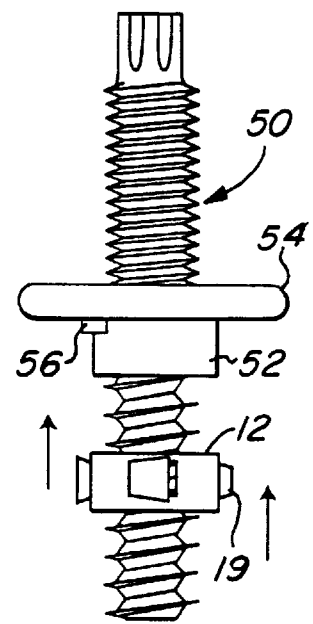
FIG. 8 is a side elevation view of a further embodiment of a double ended stud fastener in accordance with the invention, in which the double ended stud fastener has a right hand threaded upper section and a right hand threaded lower section.
Figure 8B:
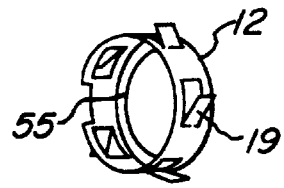
FIG. 8B is a perspective view of the locking element shown in FIG. 8 and formed with a stop lip.

FIGS. 8–8B illustrate a support section 52 formed with a tooth 56 extending laterally outwardly from the base and engaging a cutout 58 provided on the upper edge of the locking element 12. Lip 55 may optionally be provided to act as stop, as shown in FIG. 8B.

Each of the embodiments of the double-ended stud fasteners shown in FIGS. 4–8 may have upper and lower portions of the shank formed with right, left or right-left threads. Moreover, the threaded upper and lower regions may have threads formed with different pitches and with different flank angles of the threads.

In the case of a fastener whose upper and lower portions are both right-hand threaded, the present invention provides a an improvement in performance by eliminating the need to apply an excessive torque on the male screw fasteners, since the locking element prevents rotational backout due to vibration.

Utilization of the left-threaded lower section/right-threaded upper section double ended stud fastener can prevent backout due to vibration and/or resistance against counter-revolutionary attachments that might loosen the device or strip a boss.

The left-threaded/right threaded structure of the double ended stud fastener allows the male screw fastener to be removed by rotational turning beyond a predetermined torque level. Such structure allows a user to exceed the torque resistance level of the fingers, which simply results in backing the stud fastener out of the bore. In this particular structure, one of the functions of the locking element is to prevent the female threads of the female component from being stripped should the male screw fastener be over-torqued. Predetermined torque levels defining the fingers breakaway can be determined for each variation or application. Thus, the locking also prevents screws or bolts from being over-torqued into threads that are difficult to repair, or threads that would suffer irreparable damage.

Figure 9A:
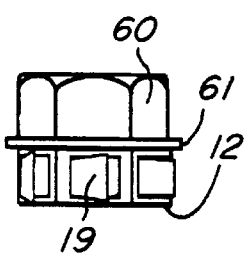
FIG. 9A is a side elevation view of the combination shown in FIG. 9.

FIGS. 9–9A illustrate a combination of a nut 60 and a locking element 12 in accordance with another embodiment of the invention. FIG. 9 illustrates the unassembled combination; FIG. 9A illustrates the assembled combination. FIG. 9A shows the locking element 12 seated against the flange 61 of nut 60.

Figure 10B:
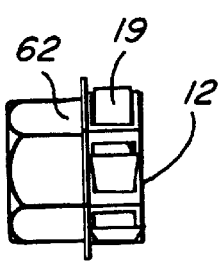
FIG. 10B is a side elevation view of the locking element and the nut of FIG. 10, shown in an assembled position.
Figure 10A:
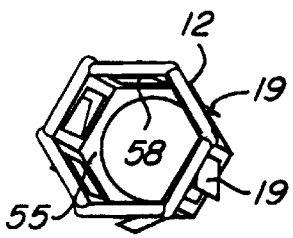
FIG. 10A is a perspective view of a locking element used in the combination of FIG. 10, which is formed with a stop lip.

FIGS. 10–10B illustrate a combination of a nut 62 and a locking element 12 in accordance with another embodiment of the invention. Nut 62 is a conventional nut body, onto which is seated the locking element 12.

Figure 11:
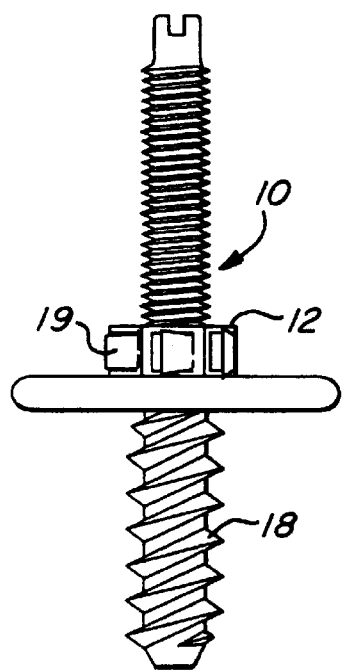
FIG. 11 is a side elevation view of a further embodiment of a double ended stud fastener in accordance with the invention, in which the double ended stud fastener has a right hand threaded upper section and a right hand threaded lower section, with a locking element mounted on the upper section of the fastener.

FIG. 11 illustrates a double ended stud fastener 10 in accordance with the invention, in which the double ended stud fastener has a right hand threaded upper section and a right hand threaded lower section, with a locking element 12 mounted on the upper section of the fastener.

Figure 12:
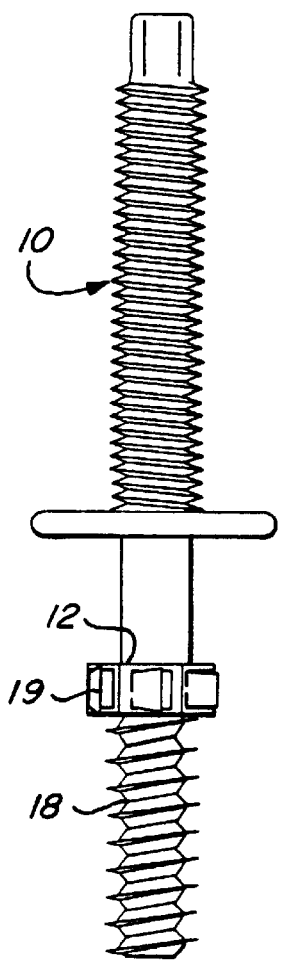
FIG. 12 is a side elevation view of a further embodiment of a double ended stud fastener in accordance with the invention, in which the double ended stud fastener has a left hand threaded upper section and a right hand threaded lower section, with a locking element mounted on the lower section of the fastener spaced apart at a distance below a plate dividing the upper and lower sections.
Figure 16:
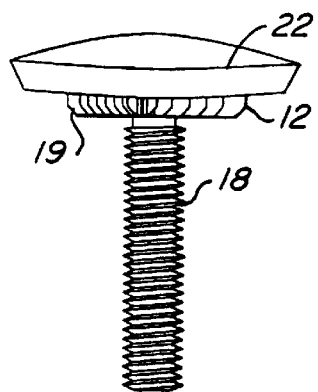
FIG. 16 is a side elevation view of an embodiment of a male screw fastener in accordance with the invention with a dome-shaped head, and a locking element integrally formed therewith.
Figure 17:
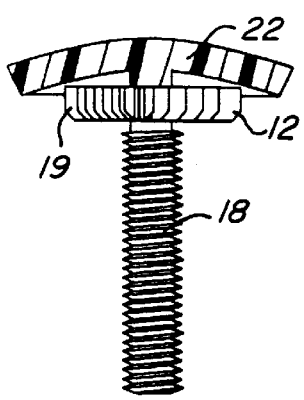
FIG. 17 is a side elevation view of the embodiment of a male screw fastener of FIG. 16, showing the dome shaped head in cross-section.
Figure 18:
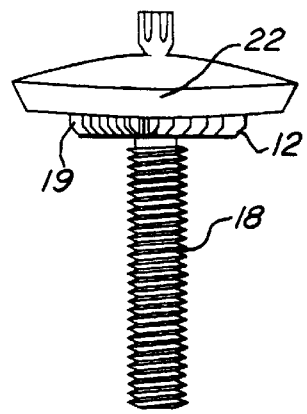
FIG. 18 is a side elevation view of an embodiment of a male screw fastener in accordance with the invention with a dome-shaped head and a driving segment which is designed to snap off when the fastener is installed, and a locking element integrally formed therewith.

FIG. 12 illustrates a double ended stud fastener in accordance with the invention, in which the double ended stud fastener has a left hand threaded upper section and a right hand threaded lower section, with a locking element mounted on the lower section of the fastener spaced apart at a distance below a plate dividing the upper and lower sections.

FIG. 13 illustrates a male screw fastener with a locking element mounted on the head of the male screw fastener, and FIG. 13A is a side elevation view of a male screw fastener with a locking element mounted below the head of the male screw fastener. FIG. 13B is a side elevation view of another embodiment of a male screw fastener with a locking element mounted below the head of the male screw fastener. FIG. 13C is a side elevation view of another embodiment of a male screw fastener with a locking element mounted below the head of the male screw fastener.

FIGS. 14, 15, 16, 17 and 18 disclose various embodiments of male screw fasteners in accordance with the invention with different head designs. The screws shown in these FIGS. are integral designs, preferably fabricated from a plastic material.

Figure 19A:
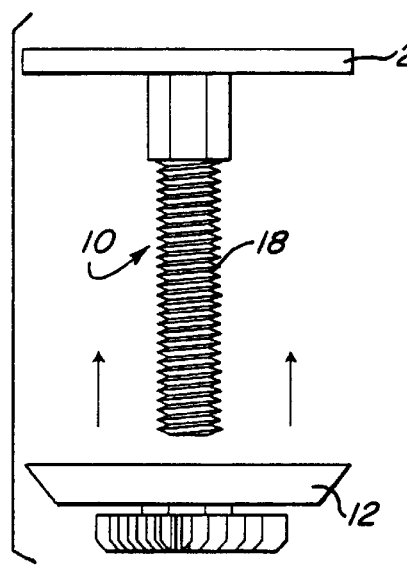
FIG. 19A is a side elevation view of an embodiment of a male screw fastener in accordance with the invention with a flat head, and a separate flat locking element which is in the process of being assembled therewith.
Figure 19B:
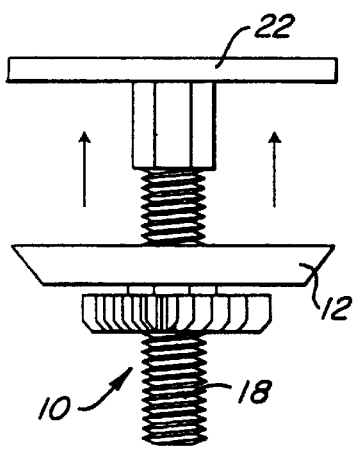
FIG. 19B is a side elevation view of the embodiment of a male screw fastener of FIG. 19A, in which the separate locking element is further assembled therewith.
Figure 19C:
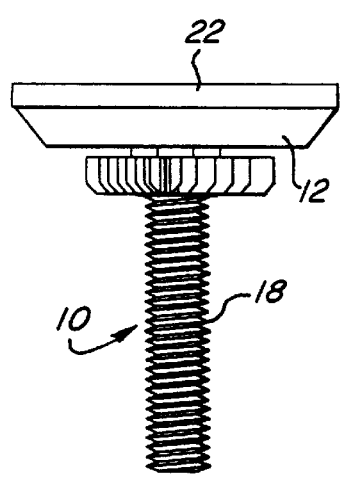
FIG. 19C is a side elevation view of the assembled male screw fastener and locking element of FIGS. 19A and 19B.

FIGS. 19A–19C illustrate a flat head male screw fastener in the process of assembly with a locking element.

Figure 20:
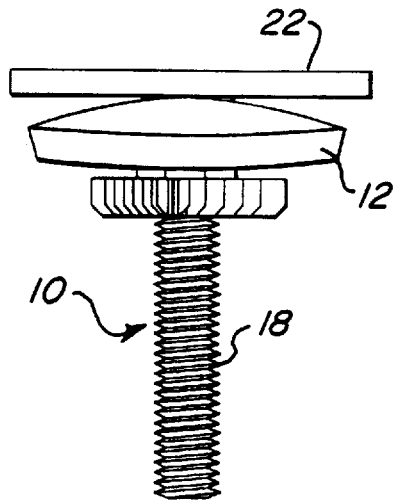
FIG. 20 is a side elevation view of an embodiment of a male screw fastener in accordance with the invention with a flat head, and a separate dome shaped sealing locking element assembled therewith.
Figure 22:
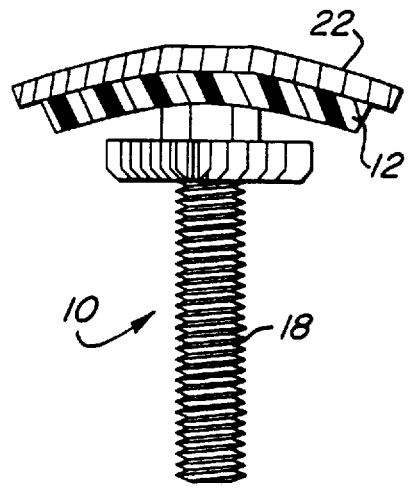
FIG. 22 is a side elevation view of the embodiment of a male screw fastener of FIG. 21, with the head shown in partial cross section.
Figure 21:
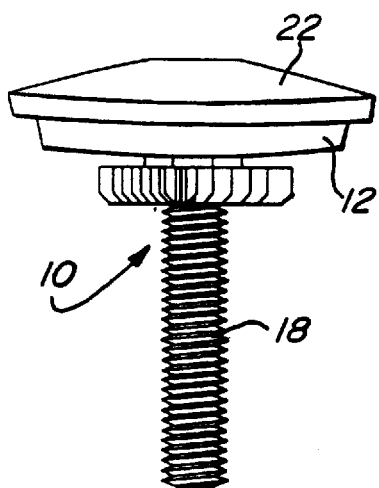
FIG. 21 is a side elevation view of an embodiment of a male screw fastener in accordance with the invention with a dome shaped head, and a separate dome shaped sealing locking element assembled therewith.

FIGS. 20–22 illustrate various embodiments of sealing combinations of screw heads and locking elements.

Figure 23:
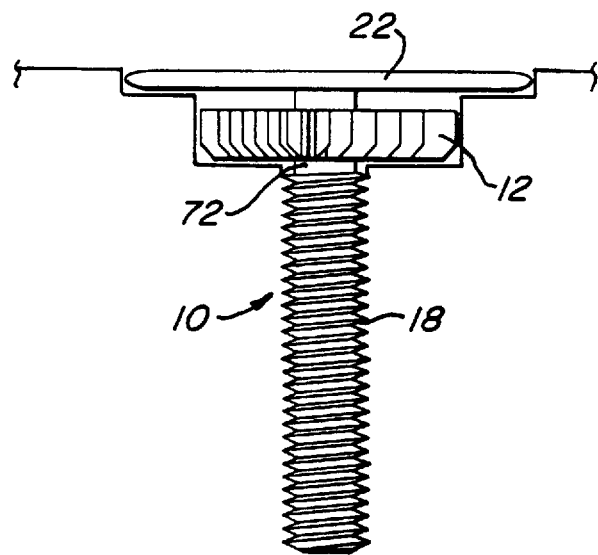
FIG. 23 is a side elevation view of an embodiment of a male screw fastener in accordance with the invention with a flat head, and a separate flat locking element which is assembled therewith.
Figure 23A:
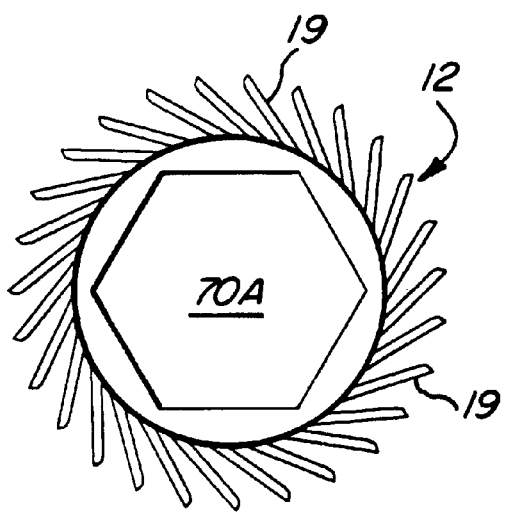
FIG. 23A is a top plan view of an embodiment of a separate flat locking element usable in the male screw fastener of FIG. 23.
Figure 23B:
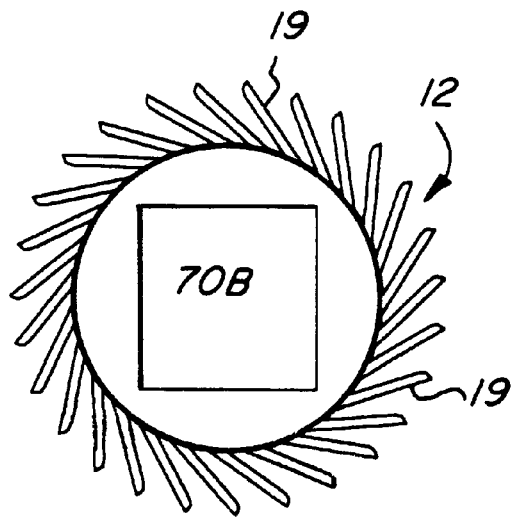
FIG. 23B is a top plan view of an embodiment of a separate flat locking element usable in the male screw fastener of FIG. 23.
Figure 23C:
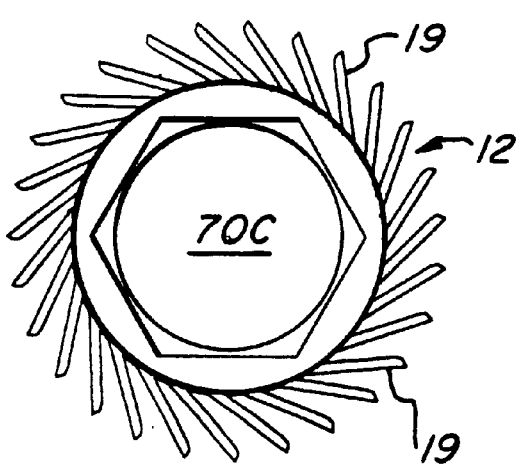
FIG. 23C is a top plan view of an embodiment of a separate flat locking element usable in the male screw fastener of FIG. 23.
Figure 23D:
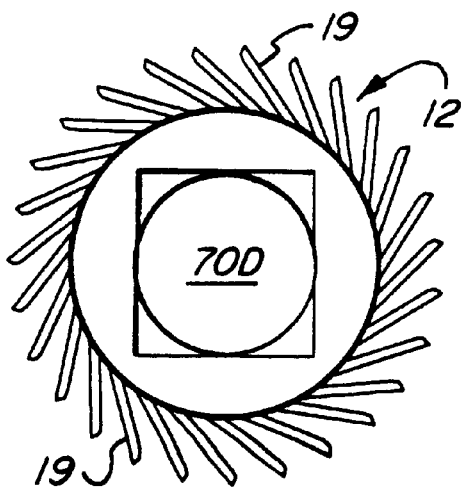
FIG. 23D is a top plan view of an embodiment of a separate flat locking element usable in the male screw fastener of FIG. 23.
Figure 28:
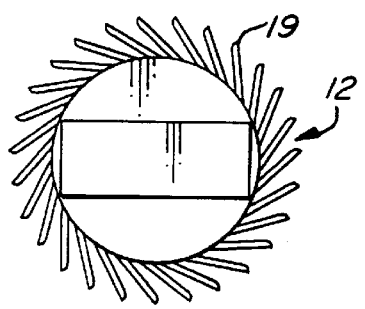
FIG. 28 is a top plan view of another example of a push-on locking element for use with the threaded male fastener of FIG. 24, which can be readily mounted by pushing the locking element onto the head of the fastener until it snap locks in position.

FIG. 23 is a side elevation view of an embodiment of a male screw fastener in accordance with the invention with a flat head, and a separate locking element which is assembled therewith. FIGS. 23A–23D are a top plan views of various embodiment of a separate locking element usable in the male screw fastener of FIG. 23, which have different center apertures 70A–70D. Center aperture 70A of FIG. 23A is hexagonal; the shank portion 72 of screw fastener 22 of FIG. 23 is similarly hexagonal in cross-section to receive the center aperture 70A. In the same way, the shank portion 72 of the screw fastener 10 will have a cross-sectional shape as appropriate to the locking element it is to be used with; e.g., the shank portion will be square in cross-section if it is used with a square apertured locking element as in FIG. 23B; or the shank portion will be circular in cross-section (with a hexagonal shoulder) if it is used with a circular apertured locking element (with a hexagonal socket) as in FIG. 23C; or the shank portion will be circular in cross-section (with a square shoulder) if it is used with a circular apertured locking element (with a square socket) as in FIG. 23D.

FIGS. 24–49 disclose various embodiments of the invention adapted so that the locking element is provided as a snap-on component that fits onto or over the head of a screw or body of a nut; this allows the locking element to be installed even after the screw is installed into a workpiece. In these embodiments, the female component is preferably specially adapted to receive and guide the fingers of the locking element into the notches with some or no rotation of the locking element.

Figure 24:
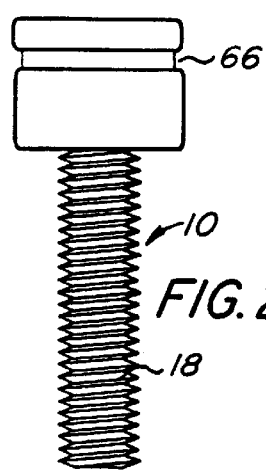
FIG. 24 is a side elevation view of a threaded male fastener with an annular slot to receive a locking element.
Figure 25:
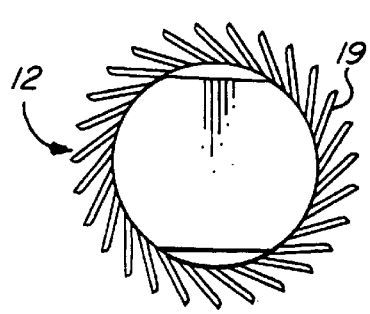
FIG. 25 is a top plan view of an example of a push-on locking element for use with the threaded male fastener of FIG. 24, which can be readily mounted by pushing the locking element onto the head of the fastener until it snap locks in position.
Figure 29:
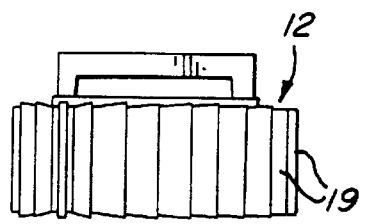
FIG. 29 is a side elevation view of the locking element of FIG. 28.
Figure 26:
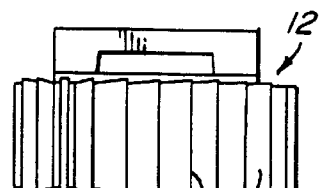
FIG. 26 is a side elevation view of the locking element of FIG. 25.
Figure 33:
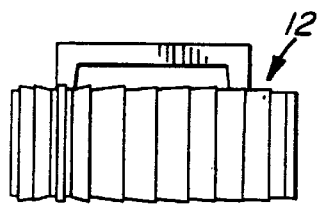
FIG. 33 is a side elevation view of the locking element of FIG. 25.
Figure 30:
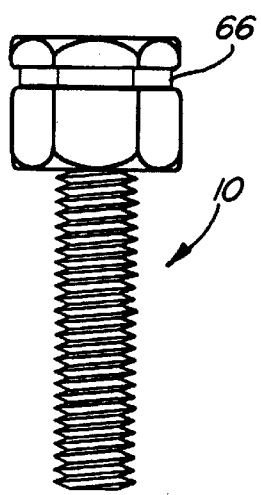
FIG. 30 is a side elevation view of another embodiment of a threaded male fastener with an annular slot to receive a locking element.
Figure 27:
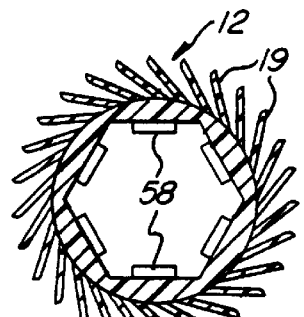
FIG. 27 is a top cross-section view of the locking element of FIG. 25.
Figure 31:
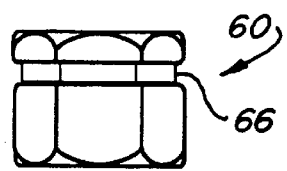
FIG. 31 is a side elevation view of a nut embodiment of a fastener with an annular slot to receive a locking element.
Figure 32:
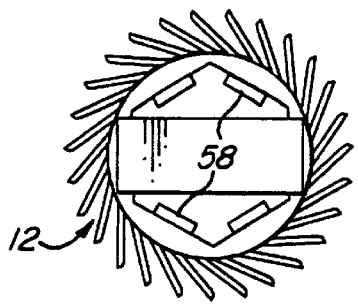
FIG. 32 is a top plan view of an example of a push-on locking element that for use with the threaded male fastener of FIG. 30, or the nut of FIG. 31, which can be readily mounted by pushing the locking element onto the head of the fastener until it snap locks in position.

Referring now to FIGS. 24–33 a variety of embodiments are shown of a fastener, such as the male screw fastener in FIGS. 24 and 30 or the female nut fastener of FIG. 31 is adapted to have a push-on locking element (as shown in FIGS. 25–27, 28–29, and 32–33) installed onto the fastener. The locking element 19 is similar to those described previously, and is provided with tabs 58 that snap into the annular slot 66 in each of the fasteners, to retain the locking element 12 to its respective fastener.

Figure 34:
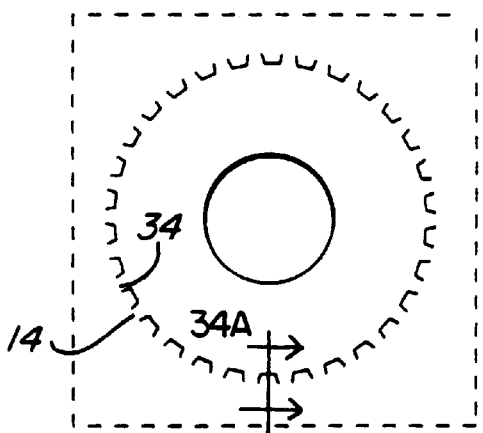
FIG. 34 is a top plan view of an embodiment of a female component adapted to receive the fasteners of either FIGS. 24, 30 or 31.
Figure 35:
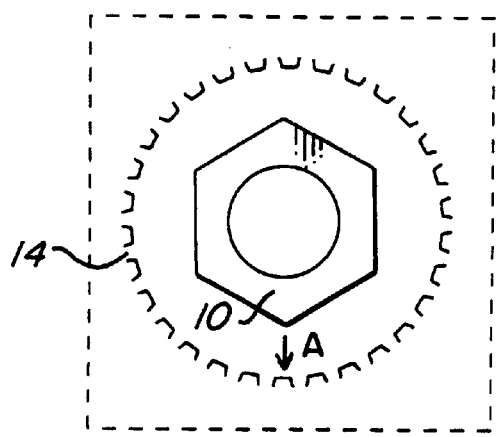
FIG. 35 is a top plan view of an embodiment of a female component with the fasteners of either FIG. 24 or 30 installed therein.
Figure 37:
FIG. 37 is a front elevation view of an embodiment of a female component wall section located between notches in the wall section.
Figure 36:
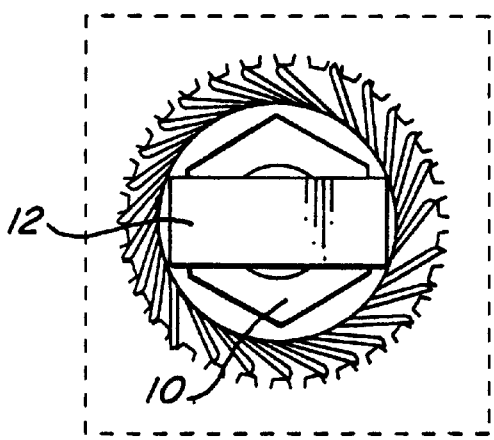
FIG. 36 is a top plan view of a female component with the fasteners of either FIG. 24 or 30 installed therein, with a locking element installed onto such fasteners.
Figure 38:
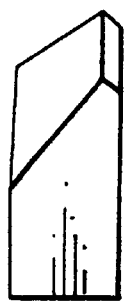
FIG. 38 is a front elevation view of another embodiment of a female component wall section located between notches in the wall section.

FIGS. 34–36 illustrate the process of assembly using the fastening elements of FIGS. 24–33. In FIG. 34 a top plan view of a female component is shown. In FIG. 35, a fastener such as a male screw fastener 10 is screwed into the bore of the female component. In FIG. 36, a locking element 12 is snapped onto the head of the male fastener 10.

Figure 34A:
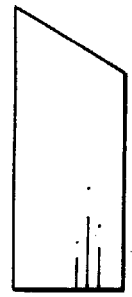
FIG. 34A is a cross-sectional view along the line 34A—34A of FIG. 34.
Figure 39A:
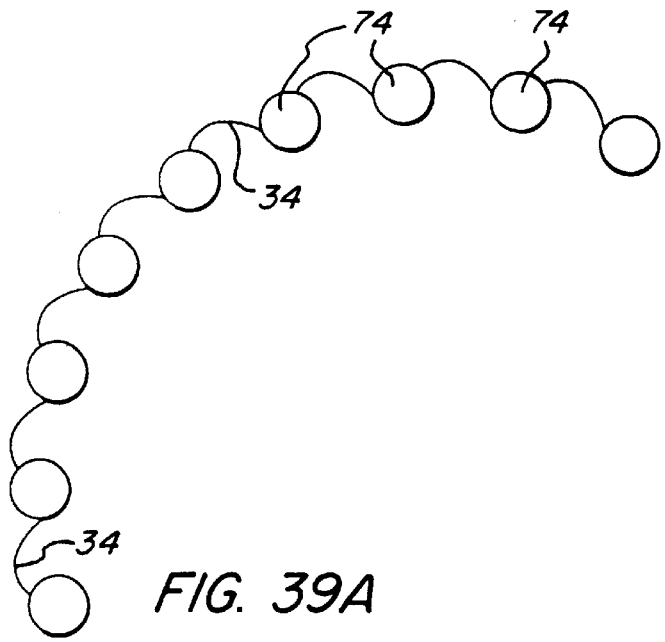
FIG. 39A is a partial top plan view of an embodiment of a female component wall section having a plurality of lobed protrusions in an upper surface thereof surrounding the cavity, which protrusions are located between notches of the cavity.
Figure 39B:
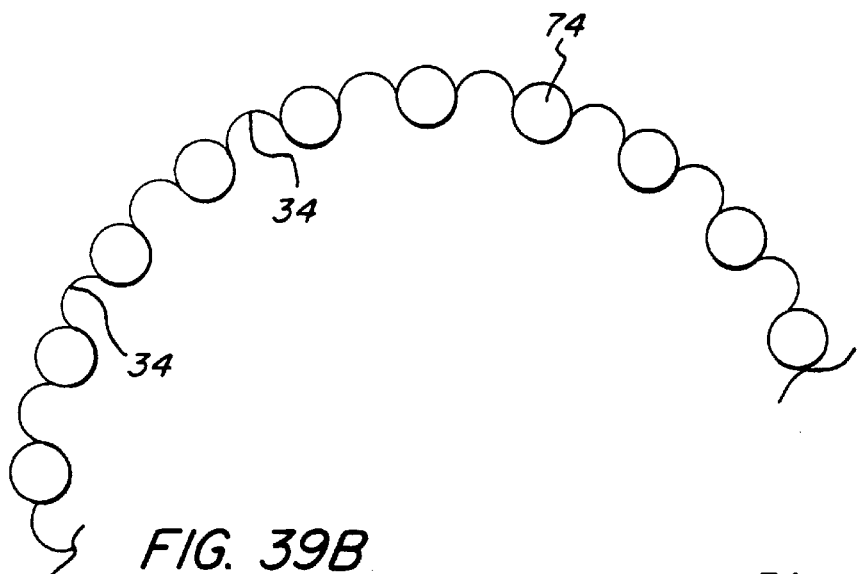
FIG. 39B is a partial top plan view of another embodiment of a female component wall section having a plurality of lobed protrusions in an upper surface thereof surrounding the cavity, which protrusions are located between notches of the cavity.
Figure 40:
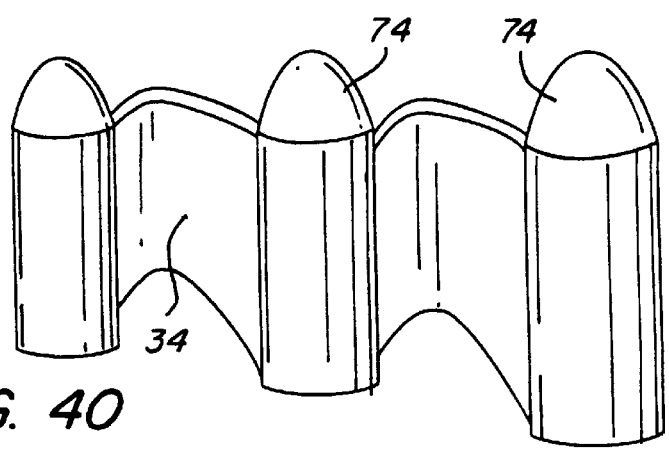
FIG. 40 is a partial perspective view of the lobed protrusions of FIG. 39, in which can be seen that the protrusions have cylindrical bodies, and wherein the notches are curved pockets located between the cylindrical bodies of the protrusions.

The positioning of the fingers of the locking element 12 into the notches 34 in the female component during the snap-on process is improved by appropriate shaping of the upper surface of the female component surrounding the cavity. Thus, preferably, the upper surface is bevelled downwardly into the cavity, as shown in FIG. 34A. Other surface shaping may include the bevelled and asymmetrically shaped surfaces of FIGS. 37 and 38. In one preferred embodiment, shown in FIGS. 39A, 39B and 40, the female component wall section has a plurality of lobed protrusions 74 in an upper surface thereof surrounding the cavity, which protrusions 74 are located between notches 34 of the cavity. As can be seen in FIG. 40, preferably the lobed protrusions 74 have cylindrical bodies, and the notches 34 are curved pockets located between the cylindrical bodies of the protrusions 74. In FIG. 39A the curved pockets are asymmetric; in FIG. 39B the pockets are symmetric.

Figure 41:
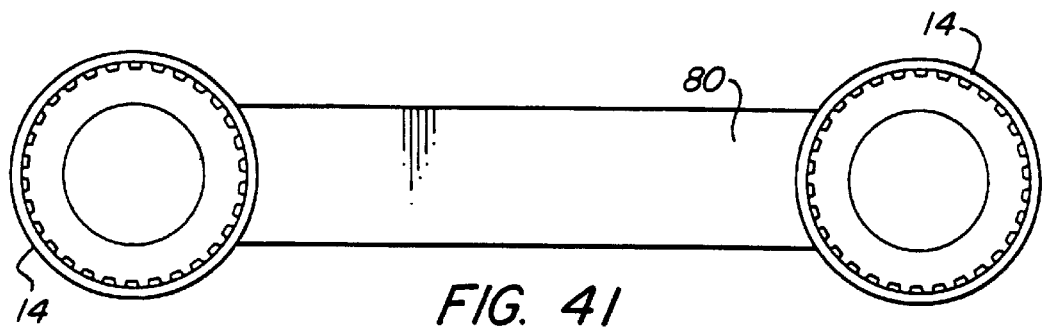
FIGS. 41–45 illustrate the use of the invention in a locking bridge embodiment, which may be used as a replacement for a lockwire assembly.
Figure 42:
Figure 43:
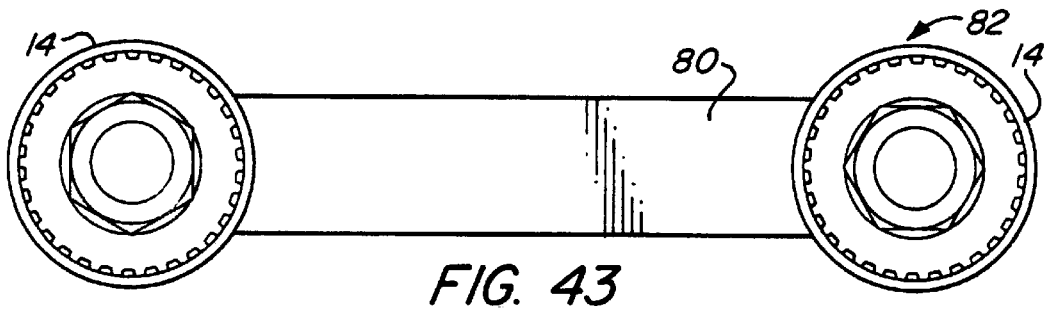
Figure 44:
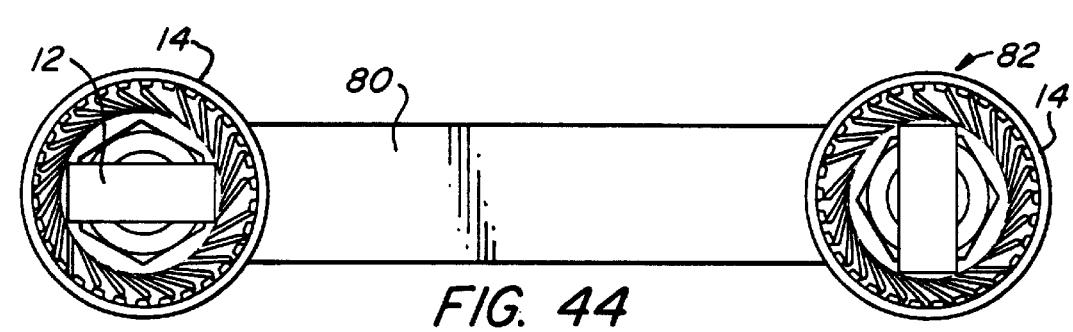
Figure 45:
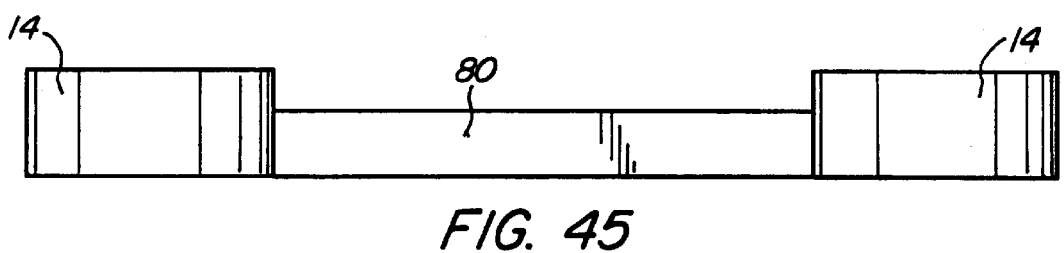

FIGS. 41–45 and 50–52 illustrate the use of the invention in a locking bridge embodiment. FIG. 41 is a top plan view of two female components 14 secured together by a connecting strap 80 in a locking bridge assembly 82. FIG. 42 is a top plan view of the heads of two installed machine screws 10. FIG. 43 is a top plan view of the locking bridge assembly 82 installed over the heads of the screws 10 of FIG. 42. FIG. 44 is a top plan view of the installed locking bridge assembly 82 of FIG. 43 where locking elements 12 have been installed into the female components 14 of the locking bridge assembly 82. FIG. 45 is a side elevation view of the locking bridge assembly 82. FIG. 50 is a top plan view of two female components 14 secured together by a telescoping connecting strap 80 in a locking bridge assembly. FIG. 51 is a top plan view of two female components 14, one fixed and one movable, on a rigid connecting strap 80 in a locking bridge assembly. FIG. 51A is a top plan view of a movable female component removed from the rigid connecting strap in the locking bridge assembly of FIG. 51. FIG. 52 is a top plan view of two female components 14 secured together by a pivoting connecting strap 80 in a locking bridge assembly.

Figure 46:
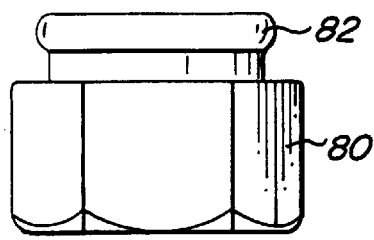
FIG. 46 is a side elevation view of a hex nut with an upper lip section adapted to receive a snap-on locking element.
Figure 47:
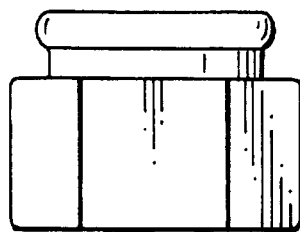
FIG. 47 is a side elevation view of a hex head screw with an upper lip section adapted to receive a snap-on locking element.
Figure 46A:
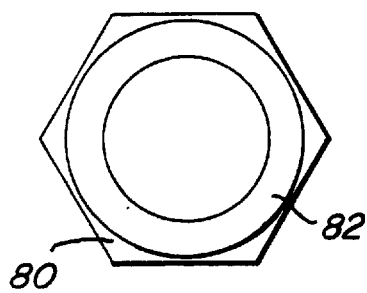
FIG. 46A is a top plan view of the nut of FIG. 46.
Figure 48A:
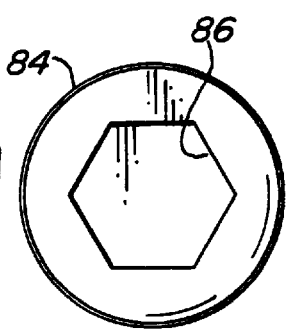
FIG. 48A is a top plan view of the screw of FIG. 48.
Figure 48:
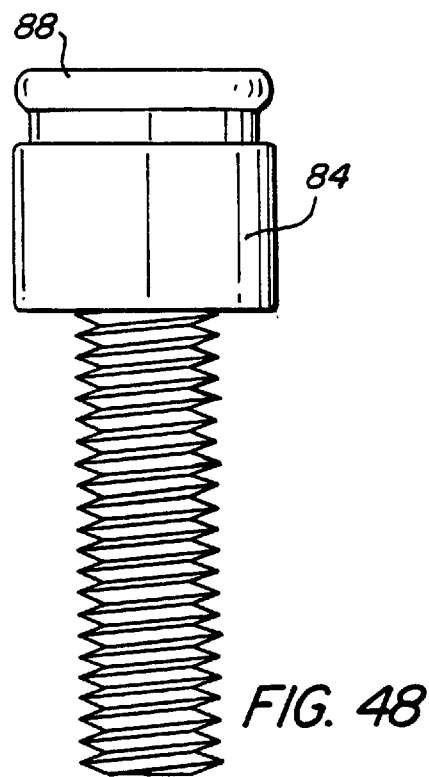
FIG. 48 is a side elevation view of a circular head screw with a recessed socket and an upper lip section adapted to receive a snap-on locking element.
Figure 49:
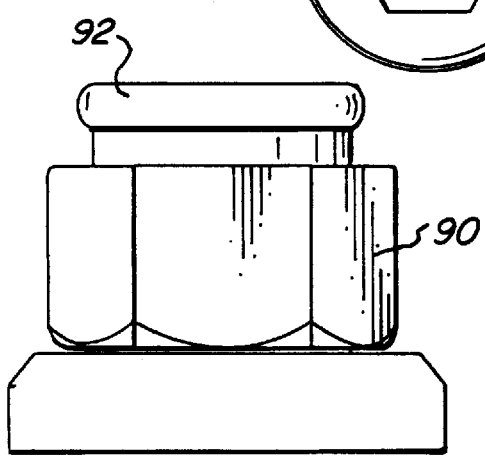
FIG. 49 is a side elevation view of a two piece nut with an upper lip section adapted to receive a snap-on locking element and/or a cap, cover or ring which locks onto the nut to protect the stud onto which the not is mounted.

FIGS. 46 and 46A illustrate a hex nut 80 with an upper lip section 82 adapted to receive a snap-on locking element. FIG. 47 illustrates a hex head machine screw with an upper lip section adapted to receive a snap-on locking element. FIG. 48 and 48A illustrate a circular head machine screw 84 with a recessed socket 86 and an upper lip section 88 adapted to receive a snap-on locking element. FIG. 49 is a side elevation view of a two piece nut 90 with an upper lip 92 section adapted to receive a snap-on locking element as well as a cap, cover or ring that mounts over the locking element to retain it in place, and which protects the stud onto which the nut 90 is mounted.

Figure 53A:
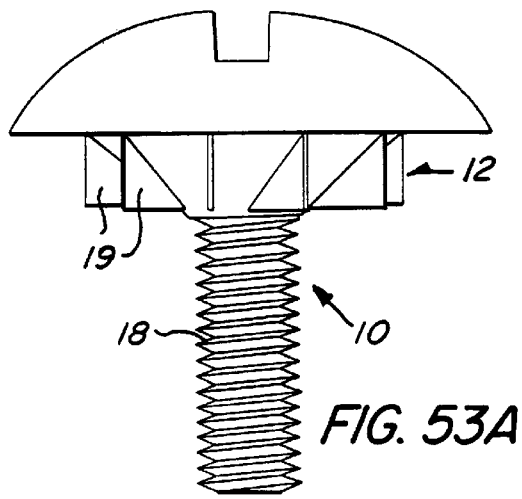
FIG. 53A is a side elevation view of an embodiment of a male screw fastener in accordance with the invention, having a locking element integrally formed therewith, in which the locking element comprises a plurality of flexible triangular fingers extending from a conical section connecting the shank and head of the fastener.
Figure 53B:
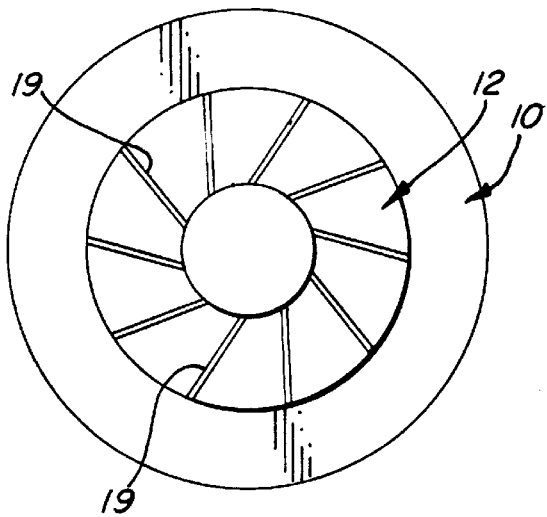
FIG. 53B is bottom plan view of the male screw fastener of FIG. 53A.

FIG. 53A is a side elevation view of an embodiment of a male screw fastener in accordance with the invention, having a locking element 12 integrally formed therewith, in which the locking element comprises a plurality of flexible triangular fingers 19 extending from a conical section connecting the shank and head of the fastener. FIG. 53B is a bottom plan view of the male screw fastener of FIG. 53A.

Figure 54A:
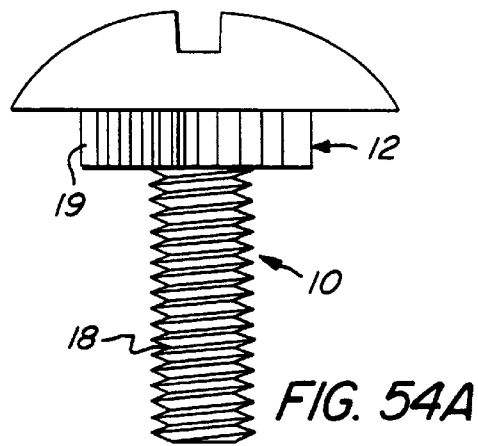
FIG. 54A is a side elevation view of an embodiment of a male screw fastener in accordance with the invention, having a locking element integrally formed therewith, in which the locking element comprises a plurality of flexible square fingers extending from cylindrical shank of the fastener.
Figure 54B:
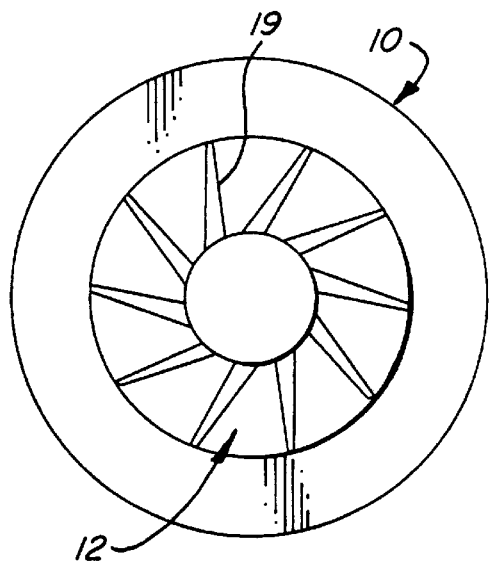
FIG. 54B is bottom plan view of the male screw fastener of FIG. 54A.

FIG. 54A is a side elevation view of an embodiment of a male screw fastener in accordance with the invention, having a locking element 12 integrally formed therewith, in which the locking element comprises a plurality of flexible rectangular (or square) fingers 19 extending from shank of the fastener. In FIG. 54A, the fingers are connected to the shank along two sides of the fingers. FIG. 54B is bottom plan view of the male screw fastener of FIG. 54A.

Figure 55:
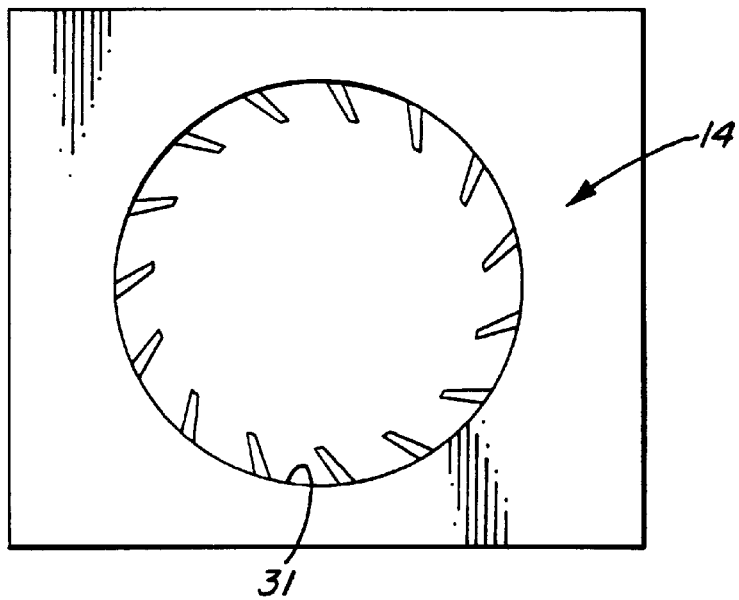
FIG. 55 is a top plan view of an embodiment of a female component in accordance with the invention, wherein walls forming notches in the female component are sized and shaped to be flexible.
Figure 56:
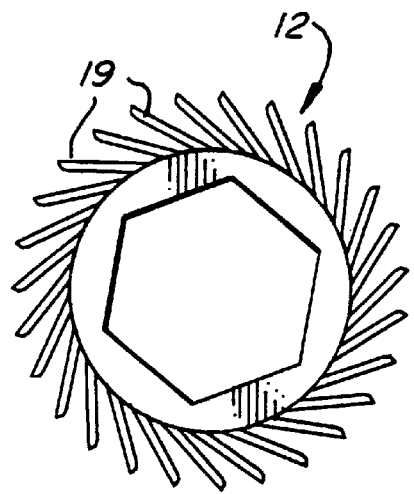
FIG. 56 is a top plan view of an embodiment of a locking element to be used in combination with the female component of FIG. 55.
Figure 57:
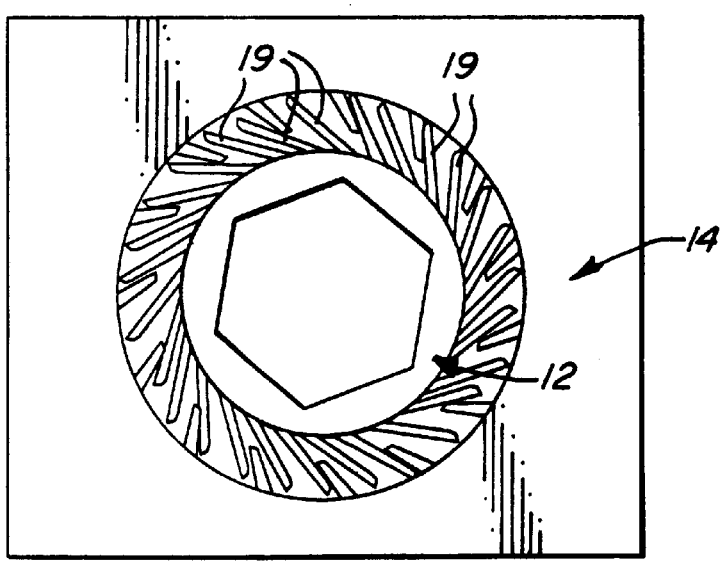
FIG. 57 is a top plan view of the combination of the locking element of FIG. 56 with the female component of FIG. 55.

FIG. 55 is a top plan view of an embodiment of a female component in accordance with the invention, wherein walls forming notches in the female component are sized and shaped to be flexible. FIG. 56 is a top plan view of an embodiment of a locking element to be used in combination with the female component of FIG. 55. FIG. 57 is a top plan view of the combination of the locking element of FIG. 56 with the female component of FIG. 55.

It is to be appreciated that the foregoing is illustrative and not limiting of the invention, and that other modifications of the invention may be chosen by persons of ordinary skill in the art, all within the scope of the invention as claimed below.

What is claimed is:

1. The combination of a self-locking threaded male fastener and a mating female component, comprising:

a self-locking threaded male fastener having a threaded shaft at a lower end thereof, and a locking element provided on said male fastener having one or more flexible fingers extending radially outwardly from said male fastener; and a female component having an axial bore for receiving said threaded shaft, a cavity being provided at an upper end of said bore, said cavity having walls formed as a plurality of teeth extending radially inwardly to define one or more notches between pairs of said teeth, said notches engaging said one or more fingers of said male fastener to limit counter-rotation of said male fastener in said female component axial bore;

said flexible fingers of said locking element having a resilience permitting said fingers to deflect when a sufficient counter-rotational force is applied to the male fastener in a direction opposite to a fastening rotational direction, said flexible fingers having a sufficient resilience to retain their original configuration upon removal of said male fastener from said mating female component.

2. A combination in accordance with claim 1 wherein said locking element is integrally formed with said threaded shaft.

3. A combination in accordance with claim 2 wherein said male fastener is a reusable fastener having a plurality of said flexible fingers, said flexible fingers having a resilience permitting said fingers to deflect when a sufficient counter-rotational force is applied to the male fastener in a direction opposite to a fastening rotational direction, said flexible fingers having a sufficient resilience to retain their original configuration upon removal of said male fastener from said mating female component.

4. A combination in accordance with claim 1 wherein one or more of said teeth are defined by side walls wherein one side wall extends in a generally radial plane with respect to said axial bore and another side wall extends angularly with respect to said radial plane, thereby defining one or more angled notches for receiving the said one or more fingers; and wherein said fingers are generally angled with respect to said radial plane to be received into said angled notches to prevent counter-rotation of the male fastener in a rotational direction opposite to a fastening rotational direction.

5. A combination in accordance with claim 4 wherein said teeth are spaced apart to provide said notches with a width at the closed ends of said notches.

6. A combination in accordance with claim 5, wherein said closed ends of said notches are flat or curved.

7. A combination in accordance with claim 4 wherein said flexible fingers are oriented to be trailing during rotation of said male fastener in said female component axial bore in a fastening direction, preventing premature engagement of said fingers in said notches.

8. A combination in accordance with claim 1 further comprising a beveled area in an upper surface of said female component surrounding said cavity, said beveled surface directing said flexible fingers to seat into said cavity when said threaded male fastener is rotated in said bore of said female component.

9. A combination in accordance with claim 1 wherein lower edges of said flexible fingers are provided with a backwardly angled leading edge, for assisting said flexible fingers to seat into said cavity when said threaded male fastener is rotated in said bore of said female component.

10. A combination in accordance with claim 1 wherein a number of said fingers is less than a number of said notches.

11. A combination in accordance with claim 1 wherein a number of said fingers is greater than a number of said notches.

12. A combination in accordance with claim 1 wherein said teeth are arranged to define a plurality of notches adapted to engage said fingers simultaneously.

13. A combination in accordance with claim 1 wherein said teeth are arranged to define a plurality of notches adapted to engage said fingers in a sequence.

14. A combination in accordance with claim 1 wherein said locking element is a separate component from said threaded shaft, and which is assembled together with said threaded shaft.

15. A combination in accordance with claim 1 wherein said locking element is made of material selected from the group consisting of metal, spring steel, rubber, plastic, and a combination of one or more of said materials.

16. A combination in accordance with claim 14 wherein said locking element is fitted onto a support section of said male fastener.

17. A combination in accordance with claim 16 wherein said support section of said male fastener has a polygonal or circular cross-section, and said locking element is formed with at least one inwardly extending snap tab which is received in a slot formed in said support section to hold said locking element in position on said support section.

18. A combination in accordance with claim 17 wherein said support section of said male fastener is provided by welding, gluing, press-fitting, swaging, molding, or slotting.

* * * * *